United States Patent
Bisson et al.

(10) Patent No.: US 12,331,651 B2
(45) Date of Patent: Jun. 17, 2025

(54) INTERNAL RETAINING RING ARRANGEMENT FOR A ROTOR ASSEMBLY

(71) Applicant: PRATT & WHITNEY CANADA CORP., Longueuil (CA)

(72) Inventors: Jocelyn Bisson, St-Basile-le-Grand (CA); Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/341,015

(22) Filed: Jun. 26, 2023

(65) Prior Publication Data

US 2024/0426215 A1  Dec. 26, 2024

(51) Int. Cl.
*F01D 5/02* (2006.01)

(52) U.S. Cl.
CPC .............. *F01D 5/025* (2013.01); *F01D 5/027* (2013.01); *F05D 2260/15* (2013.01); *F05D 2260/31* (2013.01); *F05D 2260/36* (2013.01)

(58) Field of Classification Search
CPC .......... F01D 5/025; F01D 5/026; F01D 5/027; F01D 5/066; F05D 2260/15; F05D 2260/31; F05D 2260/33; F05D 2260/36; F05D 2260/38
See application file for complete search history.

(56) References Cited

U.S. PATENT DOCUMENTS

| | | | | |
|---|---|---|---|---|
| 2,813,732 A * | 11/1957 | Hird | .................. | F16B 21/183 403/377 |
| 4,343,581 A * | 8/1982 | Millheiser | .............. | F16B 21/18 411/517 |
| 8,246,255 B2 | 8/2012 | Raberin et al. | | |
| 8,979,502 B2 | 3/2015 | Paquet et al. | | |
| 10,138,741 B2 | 11/2018 | Littler et al. | | |
| 10,392,966 B2 | 8/2019 | Caprario et al. | | |
| 11,021,958 B2 * | 6/2021 | Juh | .................. | F01D 5/066 |
| 11,391,157 B1 * | 7/2022 | Pankratov | ................ | F01D 5/10 |
| 11,480,212 B2 | 10/2022 | Weaver et al. | | |
| 2011/0165006 A1 * | 7/2011 | Hirata | .................. | F04C 28/28 418/55.3 |
| 2015/0260231 A1 * | 9/2015 | Fukutani | ................ | F01D 5/066 403/299 |
| 2015/0361901 A1 * | 12/2015 | Anglin | .................. | F01D 5/026 416/126 |

(Continued)

FOREIGN PATENT DOCUMENTS

GB  2268979 A  1/1994
WO  WO-2017065775 A1 *  4/2017 ........... E21B 17/006

OTHER PUBLICATIONS

European Search report issued in counterpart EP application No. 24184789.4 on Dec. 20, 2024.

*Primary Examiner* — Courtney D Heinle
*Assistant Examiner* — Ryan C Clark
(74) *Attorney, Agent, or Firm* — NORTON ROSE FULBRIGHT CANADA LLP (57) ABSTRACT

A rotor assembly comprises an internal snap ring seated in a groove defined in an inner diameter surface of a rotor component. The snap ring has centrifugal weights to centrifugally expand enough to compensate for a difference in thermal growth between the rotor component and the snap ring.

10 Claims, 5 Drawing Sheets

(56) References Cited

U.S. PATENT DOCUMENTS

| | | | | |
|---|---|---|---|---|
| 2015/0362108 | A1* | 12/2015 | Lefebvre | F16L 15/08 |
| | | | | 285/89 |
| 2016/0333722 | A1* | 11/2016 | Wotzak | F01D 11/003 |
| 2019/0048917 | A1* | 2/2019 | Rode | F16B 39/103 |
| 2021/0332843 | A1* | 10/2021 | Bergsten | F16B 39/10 |

* cited by examiner

INTERNAL RETAINING RING ARRANGEMENT FOR A ROTOR ASSEMBLY

TECHNICAL FIELD

The application relates generally to retaining rings and, more particularly, to an internal retaining ring arrangement for a rotor assembly.

BACKGROUND OF THE ART

Retaining rings are fasteners that may be used to axially retain components of rotor assemblies. Internal retaining rings are installed within the bore of a component whereas external retaining rings are installed on an outer surface of a component, typically within a groove. During engine running conditions various operating parameters, including rotation speeds and thermal expansions, may affect the effectiveness and the integrity of the retaining fasteners.

There is thus a continued need for new retaining ring arrangements.

SUMMARY

In one aspect, there is provided a rotor assembly of a gas turbine engine, comprising: a first rotor component rotatable about a rotation axis; a second rotor component mounted for joint rotation with the first rotor component, the second rotor component having an inner diameter surface and a groove defined in the inner diameter surface; a lock nut threadably engaged with the first rotor component to axially lock the second rotor component relative to the first rotor component; a locking washer in anti-rotation engagement with the lock nut and the second rotor component to prevent loosening of the lock nut; and an internal retaining ring engaged in the groove defined in the inner diameter surface of the second rotor component, the internal retaining ring having: a split ring body extending from a first end to a second end, the first and second ends circumferentially spaced by a gap, the split ring body having a first axially facing surface and a second axially facing surface opposite to the first axially facing surface, the first axially facing surface axially bearing against the locking washer, the second axially facing surface having a radially outer beveled edge, the radially outer beveled edge in sliding contact with a corresponding beveled edge of the groove of the second rotor component, and centrifugal weights distributed along a circumference of the split ring body, the centrifugal weights calibrated to cause a centrifugal expansion of the internal retaining ring to compensate for a thermal growth difference between the second rotor component and the internal retaining ring during operation of the gas turbine engine.

In another aspect, there is provided a method for thermal growth compensation in a rotor assembly comprising an internal snap ring seated in a groove defined in an inner diameter surface of a rotor component, the method comprising: determining a difference between a thermal growth of the rotor component and a thermal growth of the internal snap ring when the rotor assembly is subjected to a given temperature and rotating at a given rotation speed at an engine operating condition; establishing a minimal radial expansion of the internal snap ring to at least partially compensate for a difference between the thermal growth of the rotor component and the thermal growth of the internal snap ring; and determining a centrifugal weight to be added to the internal snap ring to cause the internal snap ring to centrifugally expand by at least the minimal radial expansion at the given rotation speed.

DESCRIPTION OF THE DRAWINGS

Reference is now made to the accompanying figures in which.

DETAILED DESCRIPTION

Figure 1:
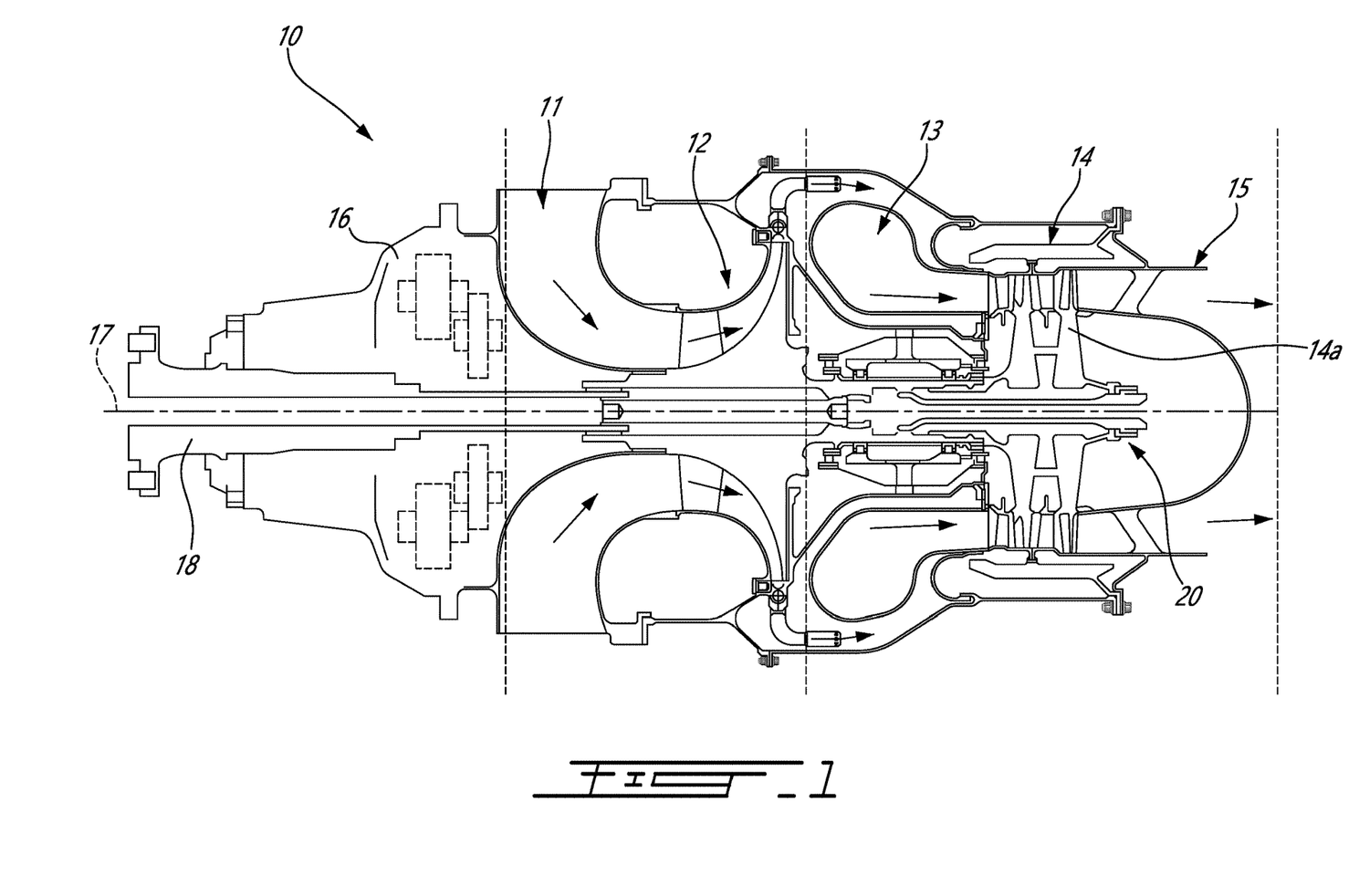
FIG. 1 is a schematic cross section view of a gas turbine engine including a rotor assembly having a snap ring type internal retaining ring with a chamfered/beveled face and integrated centrifugal weights to increase centrifugal expansion.

FIG. 1 illustrates an aircraft engine 10 of a type preferably provided for use in subsonic flight, and generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and a turbine exhaust case (TEC) 15 through which the combustion gases exit the engine 10. The turbine section 14 includes a low pressure (LP) turbine 14a (also referred to as a power turbine) drivingly connected to an input end of a reduction gearbox (RGB) 16. The RGB 16 has an output end drivingly connected to an output shaft 18 configured to drive a rotatable load (not shown). For instance, the rotatable load can take the form of a propeller or a rotor, such as a helicopter main rotor.

According to the illustrated exemplary engine, the rotors of the compressor and turbine sections 12 and 14 are mounted in-line for rotation about the engine center axis 17. However, it is understood that other arrangements are contemplated. Such rotors may include pairs of rotationally-interlocked rotary parts held at an axial location along their corresponding rotation axis via fastening means disposed directly adjacent thereto or spaced therefrom by a neighboring rotary part. A rotor assembly of so interlocked parts is generally shown at 20 in the turbine section 14. Depending on the implementation, such rotor assemblies may comprise one or more types of rotationally-interlocked rotary parts, for example shafts, bearings, seal runners, gears, and discs to name a few.

Figure 2:
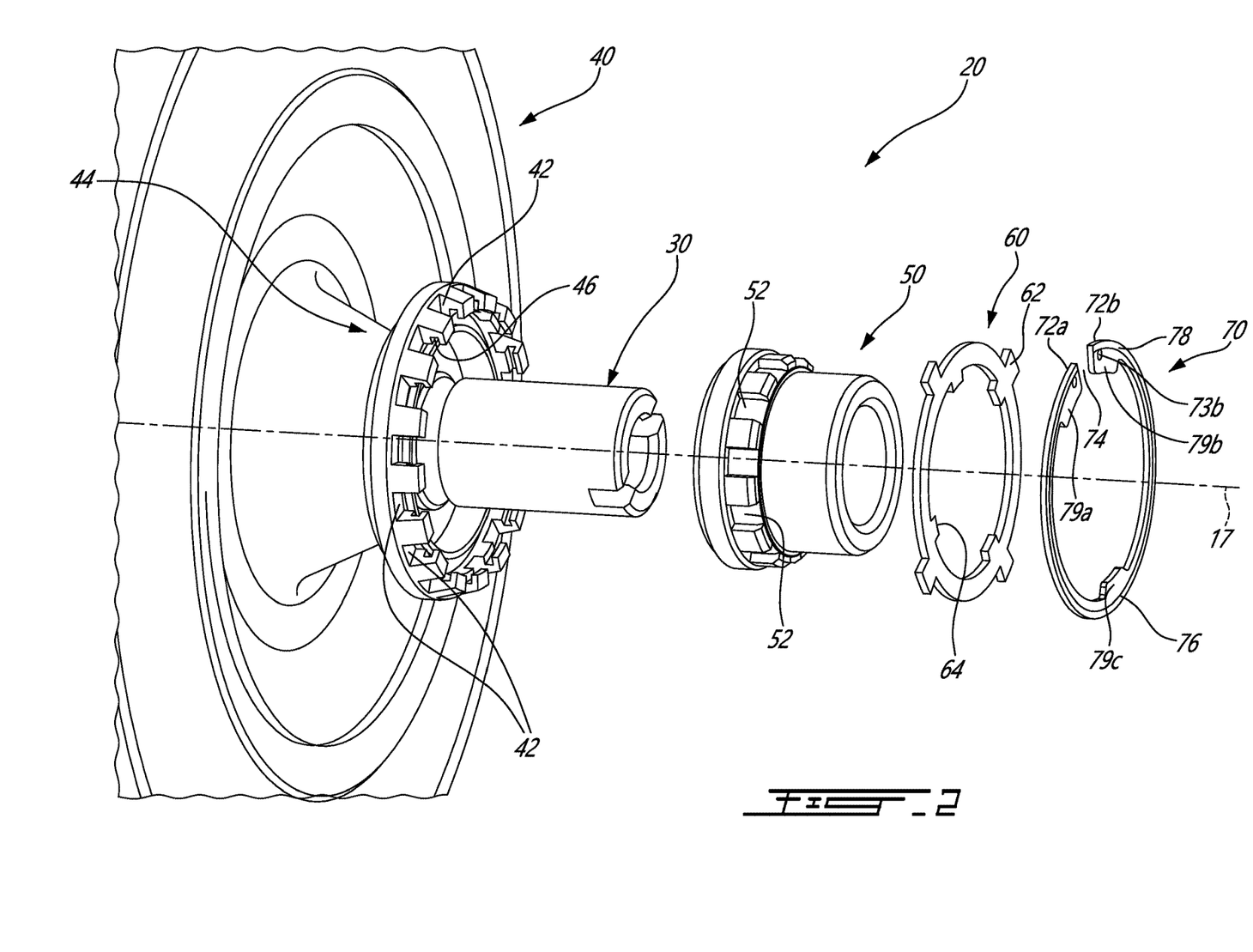
FIG. 2 is an exploded view of an exemplary rotor assembly of the engine shown in FIG. 1, the rotor assembly comprising a turbine disc, a tie shaft, a tie shaft nut, a key washer and a centrifugal chamfered internal retaining ring with integrated centrifugal weights.
Figure 3:
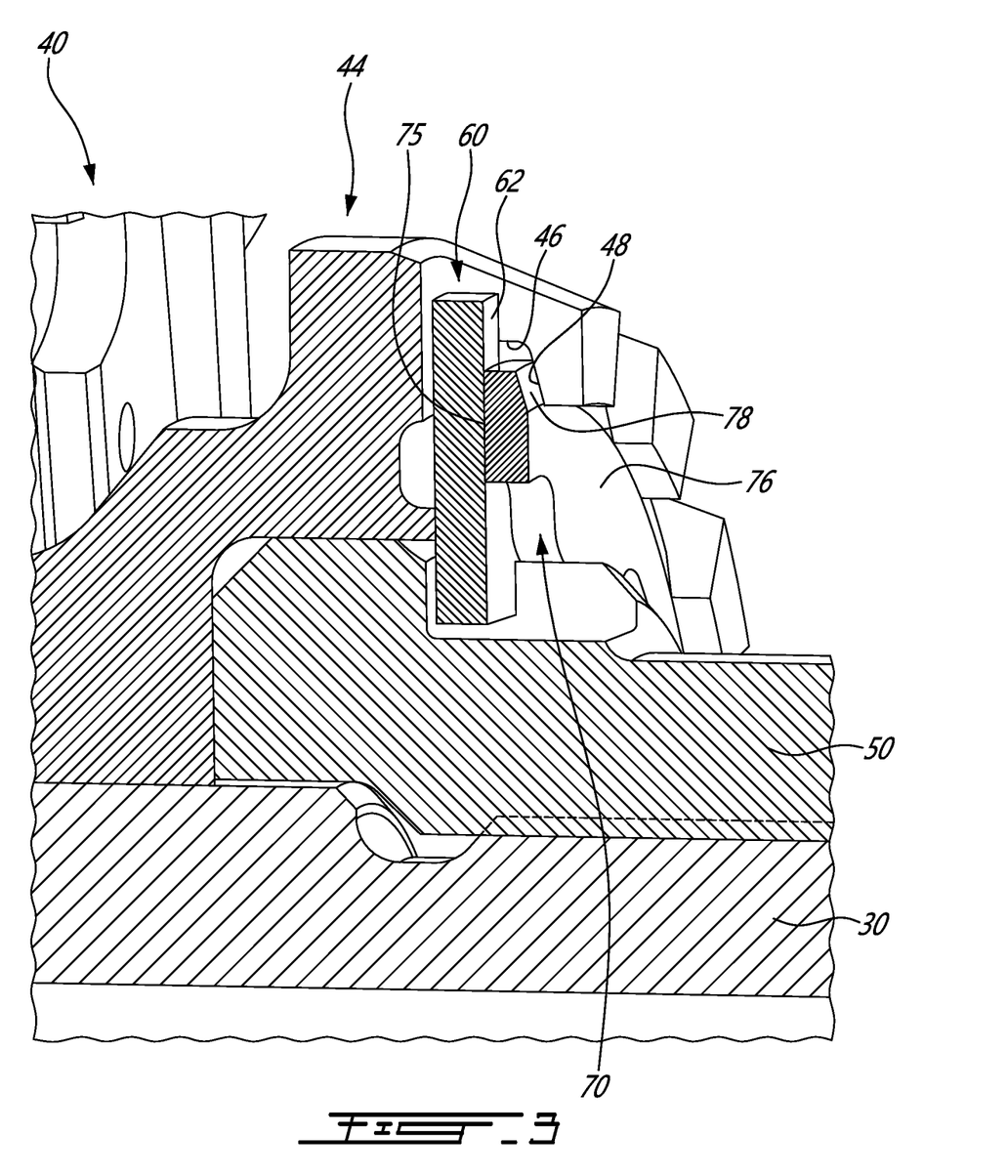
FIG. 3 is a 3D cross-section view illustrating the rotor assembly once assembled.

Referring to FIG. 2, it can be seen that the exemplified rotor assembly 20 includes a first rotor component 30 and a second rotor component 40. The first and second rotor components 30, 40 are mounted for joint rotation about the engine axis 17. According to the illustrated embodiment, the first rotor component 30 is a tie shaft and the second rotor component 40 is a turbine disc of the LP turbine 14a. However, it is understood that the rotor assembly 20 may be one of various rotor assemblies within the engine 10 and is not limited to the exemplified rotor assembly of the turbine section 14.

The exemplified rotor assembly 20 further comprises a fastener, such as a lock nut 50, threadably engaged on the tie shaft 30 for axially locking the turbine disc 40 in position on the shaft 30. A locking or anti-rotation washer 60 is provided for preventing loosening of the lock nut 50 through rotation or vibration. The locking washer 60 can adopt various configurations. For instance, the locking washer 60 may be provided in the form of a flat key washer having one or more outer anti-rotation tabs 62 projecting radially outwardly from a flat ring body for engagement in corresponding circumferentially spaced-apart anti-rotation slots 42 defined in a hollow stub shaft portion 44 projecting axially from an aft face of the hub of the turbine disc 40 concentrically around the tie shaft 30. The locking washer 60 further comprises one or more inner anti-rotation tabs 64 projecting radially inwardly from the flat ring body for engagement in corresponding key ways or anti-rotation slots 52 circumferentially distributed in the outer surface of the lock nut 50. The outer tabs 62 and the inner tabs 64 are respectively shaped complementarily to the slots 42 of the disc 40 and the slots 52 of the nut 50 for the locking washer 60 to be axially engaged with angularly aligned ones of the slots 42, 52. The depicted arrangement of tabs 62, 64 and slots 42, 52 is merely one of numerous possibilities for locking the lock nut 50 against rotation relative to the tie shaft 30.

The rotor assembly 20 further comprises an internal retaining ring 70 for axially restraining axial movement of the locking washer 60 in a direction away from the disc 40. As will be seen hereinafter, the internal retaining ring 70 may be provided in the form of a beveled-face snap ring or beveled-face circlip constructed so as to snap radially outwardly into a matching beveled groove 46 defined in an inner diameter surface of the stub shaft portion 44 of the turbine disc 40. The internal retaining ring 70 may be made of any suitable material. For instance, according to one or more embodiments, the retaining ring 70 may be made of a resilient metallic material, such as Inconel 718, stainless steel or aluminum to name a few.

Figure 4A:
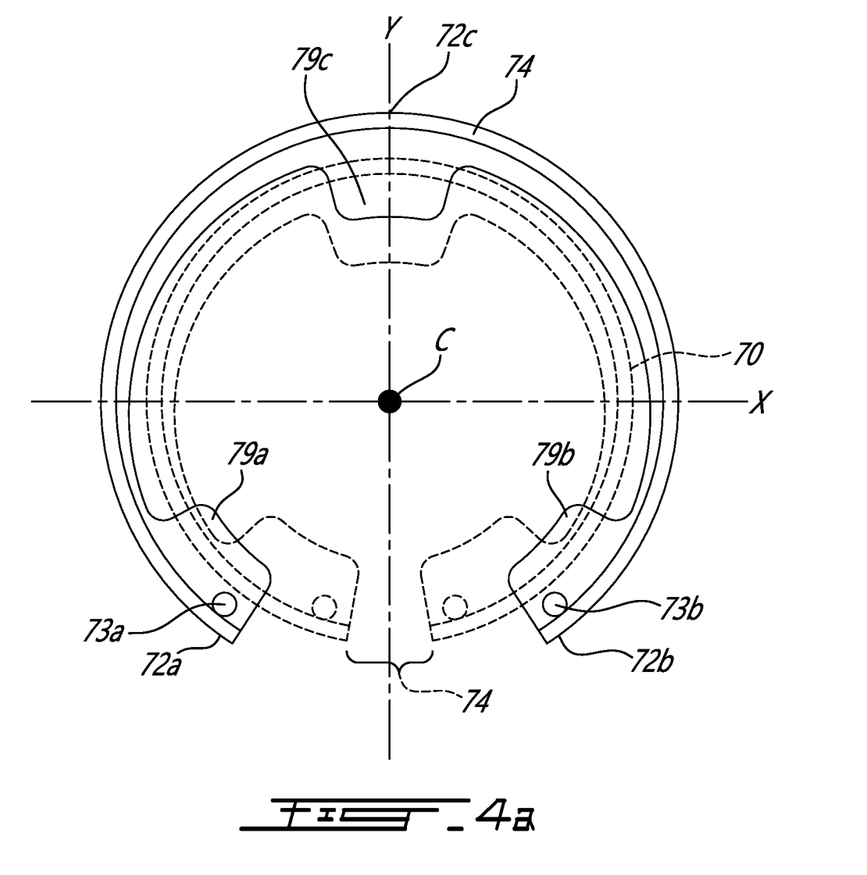
FIG. 4a is a front view illustrating the radial expansion of the inner retaining ring from a nominal at rest position (in dotted lines) to a centrifugally loaded position (in solid lines) during engine operation.

As shown in FIGS. 2 and 4a, the internal retaining ring 70 has a one-piece split ring body extending circumferentially from a first free end 72a to a second free end 72b. In the depicted implementation, the mutually opposing free ends 72a, 72b are spaced apart by a circumferential gap 74 upon the ring 70 being at the nominal diameter absent any external load (retaining ring in dotted lines in FIG. 4a). During installation and removal procedures, a tool (e.g., a snap ring plier) may be used to resiliently compress/contract the ring 70 radially inwardly such that the ends 72a, 72b are brought toward one another until the ring 70 is circumscribed by a minimum diameter smaller than the nominal diameter and sufficient to clear the wall of the groove 46. Holes 73a, 73b may be defined in the opposing ends 72a, 72b of the ring 70 for engagement with the grasping portion of the installation/removal tool. Once axially aligned with the groove 46, the ring 70 is released and allowed to spring back radially outwardly for engagement in the associated groove 46 in the disc 40, the ring 70 stopped by the groove bevel 48 and the washer 60 before reaching its resting/nominal state. The retaining ring 70 is thus spring loaded radially outwardly toward its nominal state inside the groove 46.

As best shown in FIG. 4a, the split ring body may be formed with a continuous taper, i.e. a diminishing radial width from a middle location 72c (i.e. a location circumferentially midway between the free ends 72a, 72b) to the free ends 72a, 72b. In that regard, the spring-loaded split ring body may have outer and inner circumferential surfaces, which are eccentrically, disposed so that the radial width of the split ring body decreases gradually from a maximum at the middle location 72c to a minimum at the free ends 72a, 72b. The split ring body has a median circumference between the inner and outer circumferential surfaces. The median circumference has a center of curvature C located at the intersection of two orthogonal axes X, Y. The center of curvature C also generally corresponds to the center of mass of the ring 70. The split ring body is symmetric about the axis Y, which extends through the middle location 72c, the center C and the gap 74 between the free ends 72a, 72b.

Figure 4B:
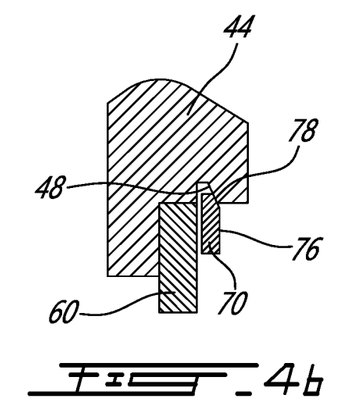
FIG. 4b is a schematic enlarged cross-section view illustrating an end play between the retaining ring and the key washer, the end play resulting from a situation where the centrifugal expansion of the retaining ring is not sufficient to compensate for a difference in thermal growth between the disc groove and the retaining ring.
Figure 4C:
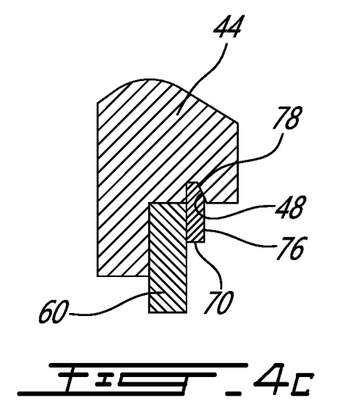
FIG. 4c is a schematic enlarged cross-section view illustrating how the end play may be closed by the addition of centrifugal weights on the retaining ring, the centrifugal weights calibrated to increase the centrifugal expansion of the ring sufficiently to compensate for the difference in thermal growth between the disc groove and the retaining ring.

Referring jointly to FIGS. 3, 4b, 4c and 5, it can be seen that the retaining ring 70 has a first axially facing planar/flat surface 75 adapted to axially bear uniformly against the back surface of the locking washer 60 so as to axially push the washer 60 firmly against the back face of the disc 40. The retaining ring 70 has a second axially facing surface 76 opposite to the first axially facing surface 75. The outer circumferential edge of the second axially facing surface 76 of the ring 70 is beveled at a suitable angle (e.g., 15 degrees) to form a beveled groove-engaging edge or radially outer beveled edge 78 (also herein referred to as a radially outer chamfered edge). The beveled edge 78 is designed to be in sliding contact with a corresponding bevel or ramp surface 48 on an axially adjacent load-bearing wall of the groove 46. The bevel 48 on the beveled load-bearing wall of the groove 46 is designed to match the beveled edge 78 of the ring 70 for maximum ring effectiveness (i.e., the beveled edge of the ring and the load-bearing wall of the groove are beveled/chamfered to the same angle). When the beveled ring 70 is installed in its groove 46, it is preloaded radially outwardly against the bevel or ramp surface 48 to act as a wedge between the load-bearing wall of the groove 46 and the part being retained (i.e., the locking washer 60). As shown in FIGS. 4b and 4c, when there is endplay between the ring 70 and the abutting face of the retained washer 60, the ring's spring action causes the ring 70 to expand more deeply radially outwardly in the groove 46, thereby compensating for the endplay. In use, this allows to reduce the transfer of vibration to the washer 60. To maintain the ring effectiveness, a minimum ring engagement in its groove should be preserved during various engine operation conditions. For instance, in some applications, the ring 70 should be seated at least halfway into the groove 46 to provide sufficient contact area with the load-bearing wall of the groove 46. According to other applications, even deeper ring engagement may be desirable to increase the axial pushing action of the ring 70 onto the washer 60. However, under certain operating conditions, the disc 40 in which the groove 46 is defined may be subject to greater thermal expansion than the retaining ring 70. In such instances, the engagement depth of the ring 70 in the groove 46 may no longer be enough to ensure proper axial loading of the locking washer 60. The resulting endplay can cause the washer 60 to vibrate and be damaged under certain operating conditions. In some extreme situations, the difference in thermal expansion between the disc 40 and the retaining ring 70 may be such that the retaining ring 70 may fall from the groove 46.

It is herein proposed to rely on the rotating nature of the rotor assembly 20 to open/radially expand the beveled retaining ring 70 by centrifugal force when the ring preload is not sufficient to match the thermal expansion of the disc 40 so as to maintain proper engagement of the beveled retaining ring 70 in its associated beveled groove 46. According to one or more embodiments, this may be accomplished by integrating calibrated centrifugal weights 79a, 79b at strategic locations along the circumference of the body of the retaining ring 70 so as to increase the centrifugal expansion of the retaining ring 70 sufficiently to compensate for a difference in thermal expansion between the turbine disc 40 and the retaining ring 70 during a broad range of engine operating conditions. The centrifugal weights 79a, 79b are calibrated to cause the retaining ring 70 to expand radially outwardly beyond its nominal diameter under a predetermined centrifugal force (see FIG. 4a). In this way, proper engagement of the retaining ring 70 in the groove 46 may be maintained when the thermal expansion of the disc 40 exceeds that of the retaining ring 70. As will be seen hereinafter, the centrifugal force required for specific applications can be calibrated as a function of the diameter of the ring 70, the disc rotation speed and the mass of the centrifugal weights 79a, 79b integrated to the ring 70.

The centrifugal force Fc can be obtained based on the following equation:

$$F_c = mr\omega^2$$

where m corresponds to a mass of the ring 70, r corresponds to a radius of curvature defined by the ring 70 relative to the axis 17, and w corresponds to a rotation speed of the rotor assembly 20 (and hence of the ring 70) about the axis 17. Therefore, in view of the range of the rotation speeds of the rotor assembly 20 and the thermal expansion gradient between the disc 40 and the retaining ring 70, any one of the parameters including the mass and the radius of the ring 70 can be set to produce a desired range of centrifugal expansion of the retaining ring 70 for a given implementation.

According to one or more embodiments, based on the above parameters, the mass of the centrifugal weights 79a, 79b is selected to obtain a desired centrifugal expansion of the ring 70 for a given set of engine operating parameters (e.g., rotation speed, thermal expansion gradients, etc.). For instance, as illustrated in FIG. 4a, first and second centrifugal weights 79a, 79b can be provided respectively at the first and second ends 72a, 72b of the retaining ring 70 to increase the opening (i.e. the radial expansion) of the split ring body under centrifugal loading. According to one or more embodiments, the centrifugal weights 79a, 79b are symmetrically disposed about the axis of symmetry Y and have a same weight so that the distribution of mass of the ring remains well balanced around its circumference. As shown in FIGS. 2 and 4a, the centrifugal weights 79a, 79b may extend radially inwardly from the inner diameter surface of the retaining ring 70. Alternatively, the centrifugal weights 79a, 79b could be provided at other locations on the ring. For instance, the centrifugal weights could protrude axially from the non-contacting face (right hand side in FIG. 3) radially inwardly of the chamfered edge 78.

The centrifugal weights 79a, 79b may be integrally formed with the split ring body of the retaining ring 70. While the centrifugal weights 79a, 79b are shown as being positioned at the free ends 72a, 72b of the split ring body, it is understood that the centrifugal weights 79a, 79b could be positioned at other locations along the circumference of the split ring body as long as the centrifugal weights remain effective for opening/expanding the retaining ring 70 under a predetermined centrifugal loading condition. For instance, according to one or more embodiments, the centrifugal weights 79a, 79b may be located inboard of the free ends 72a, 72b of the split ring body but still at a location circumferentially closer to the free ends 72a, 72b than the middle location 72c (the central top location in FIG. 4a). That is the pair of centrifugal weights 79a, 79b could be positioned at any locations below axis X in FIG. 4a. (i.e., on a side of the axis X opposite to the middle location 72c).

According to one or more embodiments, the procedure to calculate the mass of the centrifugal weights may entail: Determining the disc groove growth with thermal expansion calculation estimation using formula d1=d0*[ΔT*α+1] where d0 is initial diameter, d1 is final diameter, ΔT is delta temperature & α is thermal expansion coefficient. Disc centrifugal growth is considered negligible in this example because it is a stiff full ring therefore radial displacements are small. However, in another application where expansion of the outer groove is significant, this parameter may be considered in addition to thermal growth. The procedure/method further comprises estimating the force required to open the ring 70 to obtain same radial displacement as disc groove's thermal growth (either via geometric simplification & strain calculation or FEA software). Then, the procedure method may comprise determining the mass of weight based on relative centrifugal force formula Fc=m*ω²*r combined with trigonometry if required to accommodate for step 2 geometric simplification. Depending on the delta temperature between the disc 44 and the ring 70, we can add or not the thermal expansion of the ring using thermal expansion formula. Still according to one or more embodiment, the method/procedure may further comprise distributing the mass along ring to ensure that center of mass (expanded state) is aligned with axis of rotation of the rotor assembly to prevent off balance.

According to another aspect of the disclosure, it is contemplated to use an iterative approach to create a selection table with the different characteristics (RPM, diameter, temperature, ring width, ring height, etc.). The table could be used to select a ring with the appropriate centrifugal weights for a given set of parameters of a given rotor application.

Still referring to FIGS. 2 and 4a, an additional weight 79c may be provided at the middle location 72c to counterbalance the centrifugal weights 79a, 79b added to the free ends 72a, 72b. The mass of the additional weight 79c may be selected to offset a mass unbalance created by the presence of the centrifugal weights 79a, 79b. According to some embodiments, the additional weight 79c may weight more than the individual weight of first and second centrifugal weights 79a, 79b. In some applications where the retaining ring 70 remains substantially balance after the addition of the centrifugal weights 79a, 79b or where the overall mass distribution of the retaining ring 70 has negligible impact on the balance of the rotor assembly 20, the additional weight 79c may be omitted.

Figure 5:
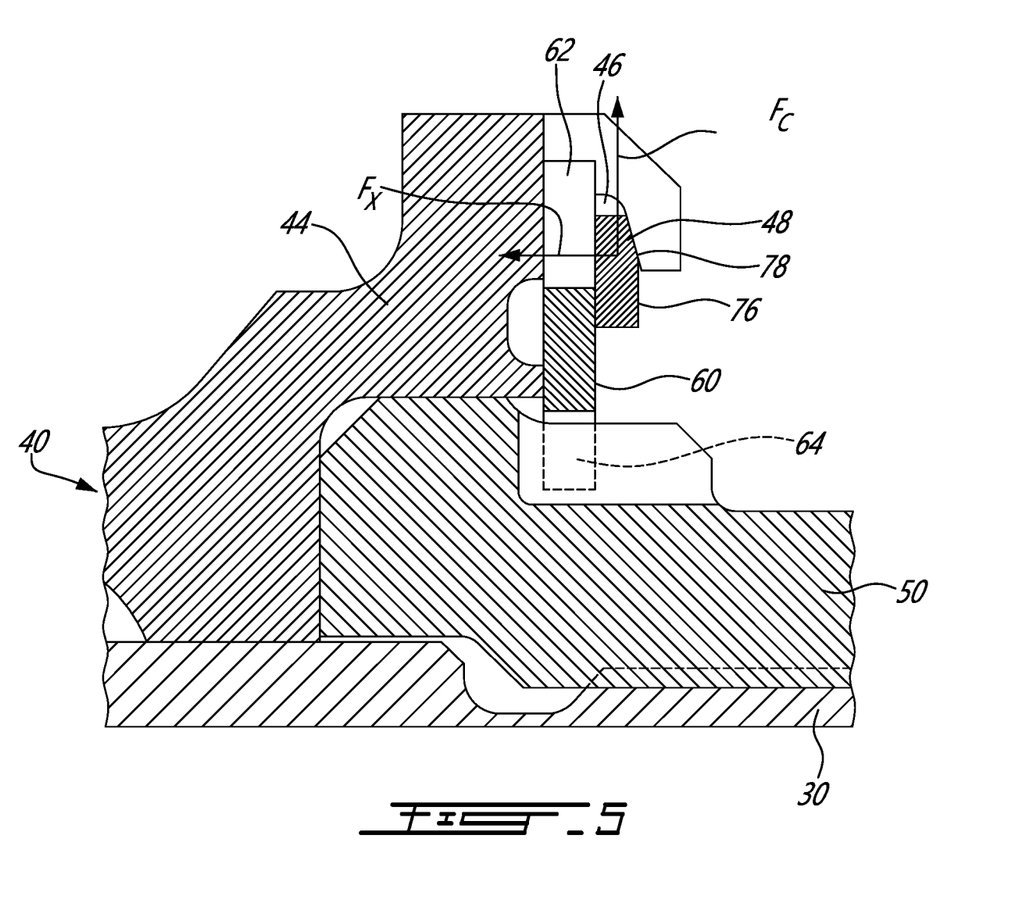
FIG. 5 is a schematic cross-section view illustrating how the radial expansion of the retaining ring is transferred in an axial pushing action on the key washer to eliminate axial free play/end play and mitigate key washer vibrations.

In use, as shown in FIGS. 4a-4c, the centrifugal weights 79a, 79b will cause the retaining ring 70 to open or resiliently expand radially outwardly under centrifugal load from its nominal state (FIG. 4b and ring in dotted lines in FIG. 4a) to a centrifugally expanded state (FIG. 4c and ring in solid lines in FIG. 4a) to compensate for the thermal growth of the disc 40 relative to the retaining ring 70. The mass of the centrifugal weights 79a, 79b is selected so that the centrifugal expansion of the ring 70 beyond its nominal state is sufficient to compensate for a difference in thermal expansion between the disc 40 and the retaining ring 70 for a given rotation speed of the rotor assembly 20 during engine operation. As the retaining ring 70 radially expands further into the groove 46 under the centrifugal load, the bevel edge 78 of the ring 70 slides on the matching bevel or ramp surface 48 of the groove 46, thereby pushing the retaining ring 70 axially against the locking washer 60. That is the retaining ring 70 is deflected axially toward the washer 60 as the ring 70 is expanded radially outwardly under the centrifugal load. As shown in FIG. 5, the centrifugal force Fc is reacted at the bevel interface between the retaining ring 70 and the load-bearing wall of the groove 46 into an axial force Fx in a direction towards the washer 60. By calibrating the centrifugal force Fc via the centrifugal weights 79a, 79b, it can thus be possible to calibrate the axial force Fx exerted by the retaining ring 70 onto the locking washer 60.

In accordance with a general aspect of the present disclosure, there is provided a method for thermal growth compensation in a rotor assembly comprising an internal snap ring seated in a groove defined in an inner diameter surface of a rotor component. The method comprises determining a difference between a thermal growth of the rotor component and a thermal growth of the internal snap ring when the rotor assembly is subjected to a given temperature and rotating at a given rotation speed at an engine operating condition. The method further comprises establishing a minimal radial expansion of the internal snap ring to at least partially compensate for a difference between the thermal growth of the rotor component and the thermal growth of the internal snap ring. Then, a centrifugal weight to be added to the internal snap ring is determined to cause the internal snap ring to centrifugally expand by at least the minimal radial expansion at the given rotation speed.

The method may further comprises determining an additional weight to be added along a circumference of the internal snap ring to balance a weight distribution around the circumference of the internal snap ring after adding the centrifugal weight.

According to another aspect, the step of determining the centrifugal weight to be added to the internal snap ring comprises calculating a value of a first and a second centrifugal weight to be respectively added at a first and a second free end of the internal snap ring.

The step of determining the additional weight may comprise locating the additional weight at a circumferential location midway between the first and second free ends of the internal snap ring.

Still according to a general aspect, the first and second centrifugal weights and the additional weight may be added at an inner diameter surface of the internal snap ring. According to a general aspect of the thermal growth compensation method, the internal snap ring may be provided with a bevel edge at an outer circumference thereof for engagement with a corresponding bevel edge of the groove of the rotor component. The step of providing the internal snap ring may comprise integrally forming the centrifugal weight on an inner diameter surface of a split ring body of the internal snap ring.

According to another general aspect, the step of determining the centrifugal weight to be added to the internal snap ring may comprise determining a centrifugal force needed to obtain the minimal radial expansion, the centrifugal force calibrated as a function of a diameter of the internal snap ring, the given rotation speed and a mass of the centrifugal weight.

In accordance with one or more embodiments, there may also be provided a snap ring type internal retaining ring architecture with a chamfered/beveled side that incorporates integrated counterweights installed inside a rotor component groove with a matching opposite bevel angle. The counterweights integrated to the inner side of the retaining ring apply centrifugal force and open/expand the ring when the rotor component (e.g., rotor disc) is rotating. By opening further, the ring diameter increases but because the ring is installed in a beveled groove, it reacts against the groove beveled surface and creates an axial displacement along rotor component center axis. The axial pressure generated is transferred to a key washer engaged with a locking nut and one of the components of the rotor assembly, thereby removing the free play between the washer and the rotor component and providing for the correct engagement of the chamfered retaining ring to mitigate key washer vibration.

According to one or more embodiments, there is provided an internal snap ring with a chamfered side that incorporates integrated weights on the inner diameter thereof in order to apply a centrifugal force that will translate into an axial force due to a beveled interface with a rotor component of a rotor assembly. According to one aspect, the beveled interface and the centrifugal action cooperate to axially push the internal snap ring against a key washer to thereby mitigate any axial endplay in any running condition and, thus, reduce the risk of fretting and improve the rotor assembly balancing.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the centrifugal loading concept of the internal retaining ring can be applied to shaft, disc or any rotating parts with key washer assemblies. Furthermore, although FIG. 1 shows a turboprop-type engine, it is understood the present disclosure is also applicable to other types of engines and mechanical assemblies having rotor assemblies with internal retaining rings. Yet further modifications could be implemented by a person of ordinary skill in the art in view of the present disclosure, which modifications would be within the scope of the present technology.

The invention claimed is:

1. A rotor assembly of a gas turbine engine, comprising:
   a first rotor component rotatable about a rotation axis;
   a second rotor component mounted for joint rotation with the first rotor component, the second rotor component having an inner diameter surface and a groove defined in the inner diameter surface;
   a lock nut threadably engaged with the first rotor component to axially lock the second rotor component relative to the first rotor component;
   a locking washer in anti-rotation engagement with the lock nut and the second rotor component to prevent loosening of the lock nut; and an internal retaining ring engaged in the groove defined in the inner diameter surface of the second rotor component, the internal retaining ring having:
a split ring body extending from a first end to a second end, the first and second ends circumferentially spaced by a gap, the split ring body having a first axially facing surface and a second axially facing surface opposite to the first axially facing surface, the first axially facing surface axially bearing against the locking washer, the second axially facing surface having a radially outer beveled edge, the radially outer beveled edge in sliding contact with a corresponding beveled edge of the groove of the second rotor component, and centrifugal weights distributed along a circumference of the split ring body, the centrifugal weights calibrated to cause a centrifugal expansion of the internal retaining ring to compensate for a thermal growth difference between the second rotor component and the internal retaining ring during operation of the gas turbine engine.

2. The rotor assembly of claim 1, wherein the centrifugal weights comprise first and second centrifugal weights symmetrically disposed on opposite sides of a symmetry axis of the split ring body, the first and second centrifugal weights located on the circumference of the split ring body at a circumferential location closer to the first and second ends than to a middle location circumferentially midway between the first and second ends.

3. The rotor assembly of claim 2, wherein the first and second centrifugal weights are respectively provided at the first and second ends of the split ring body, and wherein an additional weight is provided at the middle location, the additional weight calibrated to balance a weight distribution around the circumference of the split ring body.

4. The rotor assembly of claim 3, wherein the first and second centrifugal weights and the additional weight are integrally provided on an inner diameter surface of the split ring body.

5. The rotor assembly of claim 3, wherein the first and second centrifugal weights have a same weight, and wherein the additional weight is greater than the weight of the first and second centrifugal weights.

6. The rotor assembly of claim 1, wherein the retaining ring has a nominal diameter, and wherein the centrifugal weights are calibrated to cause the retaining ring to centrifugally expand radially outwardly beyond its nominal outer diameter when a thermal growth of the second rotor component exceeds that of the retaining ring.

7. The rotor assembly of claim 1, wherein the first and second rotor components are respectively a tie shaft and a turbine disc, and wherein the locking washer is a key washer having a flat annular body with a first set of anti-rotation tabs projecting radially outwardly from the flat annular body and a second set of anti-rotation tabs projecting radially inwardly from the flat annular body, the first set of anti-rotation tabs engageable with corresponding slots defined in the turbine disc, the second set of anti-rotation tabs engageable with corresponding slots defined in the lock nut.

8. The rotor assembly of claim 1, wherein the centrifugal weights are calibrated to match the thermal growth difference between the second rotor component and the retaining ring during engine operation.

9. The rotor assembly of claim 1, wherein the centrifugal weights includes first and second centrifugal weights respectively disposed at the first and second ends of the split ring body, and wherein an additional weight is provided circumferentially midway between the first and second ends of the split ring body to provide a balanced weight distribution around the circumference of the split ring body.

10. The rotor assembly of claim 9, wherein the internal retaining ring tapers from a maximum radial width at a circumferentially midway location between the first and second ends to a minimum radial width at the first and second ends.

* * * * *